US012676410B2

(12) United States Patent
Wang et al.

(10) Patent No.: US 12,676,410 B2
(45) Date of Patent: Jul. 7, 2026

(54) SYSTEM AND METHOD FOR EFFICIENT ANTENNA WEIGHT VECTOR TABLES WITHIN PHASED-ARRAY ANTENNAS

(71) Applicant: Kyocera International Inc., San Diego, CA (US)

(72) Inventors: James Wang, San Diego, CA (US); Mike Yang, San Diego, CA (US)

(73) Assignee: Kyocera International Inc., San Diego, CA (US)

( * ) Notice: Subject to any disclaimer, the term of this patent is extended or adjusted under 35 U.S.C. 154(b) by 257 days.

(21) Appl. No.: 18/392,920

(22) Filed: Dec. 21, 2023

(65) Prior Publication Data

US 2024/0213669 A1 Jun. 27, 2024

Related U.S. Application Data

(60) Provisional application No. 63/450,738, filed on Mar. 8, 2023, provisional application No. 63/434,830, filed on Dec. 22, 2022.

(51) Int. Cl.
*H01Q 3/36* (2006.01)

(52) U.S. Cl.
CPC .................................... *H01Q 3/36* (2013.01)

(58) Field of Classification Search
CPC ........... H01Q 3/36; H01Q 3/26; H04B 7/0617
USPC ........................................................ 375/299
See application file for complete search history.

(56) References Cited

U.S. PATENT DOCUMENTS

2011/0105032 A1* 5/2011 Maruhashi ........... H04B 7/0617 455/59
2017/0187109 A1* 6/2017 Wang ....................... H01Q 3/36

OTHER PUBLICATIONS

PCT Office Search Report, dated Apr. 25, 2024 (5 pages).
PCT Written Opinion, dated Apr. 25, 2024 (5 pages).

* cited by examiner

*Primary Examiner* — Fitwi Y Hailegiorgis
(74) *Attorney, Agent, or Firm* — Helen Mao; Imperium Patent Works

(57) ABSTRACT

Method and system are provided for reducing the AWV table size for phased-array antenna. In one novel aspect, the AWV table is decomposed to a combination of a first AWV table and a second AWV table, with a combined size smaller than the size of the AWV table. In one novel aspect, a group of decomposable AWVs are identified and each decomposed into a decomposed first AWVs and a decomposed second AWVs. In one embodiment, the decomposable weights W that are decomposed into $W_h$ being a function of both elevation $\theta$ and azimuth $\varphi$ and $W_v$ being a function of elevation $\theta$ only. In one novel aspect, the AWV table for a phased-array antenna with N antenna elements with $M_v$ weights in a vertical direction and $M_h$ weights in a horizontal direction is decomposed into a first AWV table and a second AWV table with a combined size of $N*(M_v+M_h)$.

20 Claims, 8 Drawing Sheets

SYSTEM AND METHOD FOR EFFICIENT ANTENNA WEIGHT VECTOR TABLES WITHIN PHASED-ARRAY ANTENNAS

CROSS REFERENCE TO RELATED APPLICATIONS

This application claims the benefit under 35 U.S.C. § 119 from U.S. provisional application Ser. No. 63/434,830, entitled "SYSTEM AND METHOD FOR EFFICIENT ANTENNA WEIGHT VECTOR TABLES WITHIN PHASED-ARRAY ANTENNAS," filed on Dec. 22, 2022, the subject matter of which is incorporated herein by reference. This application claims the benefit under 35 U.S.C. § 119 from U.S. provisional application Ser. No. 63/450,738, entitled "SYSTEM AND METHOD FOR EFFICIENT ANTENNA WEIGHT VECTOR TABLES WITHIN PHASED-ARRAY ANTENNAS," filed on Mar. 8, 2023, the subject matter of which is incorporated herein by reference.

TECHNICAL FIELD

The disclosed embodiments relate generally to phased-array antennas, and, more particularly, to efficient antenna weight vector (AWV) within phased-array antennas.

BACKGROUND

Phased-array antennas represent a sophisticated and versatile class of antenna systems that have gained prominence in various applications, ranging from radar and communication systems to satellite and wireless networks. Phased-array antennas offer several advantages, including high-speed beam agility, improved signal quality, and the ability to handle multiple tasks simultaneously. Unlike traditional antennas that rely on mechanical steering for beam direction, phased-array antennas achieve beam control through electronic means, providing rapid and precise adjustments. At the core of a phased-array antenna are multiple individual antenna elements, each connected to a phase shifter. By manipulating the phase of the signals applied to these elements, the antenna system can shape and steer the emitted or received electromagnetic waves. This electronic beam steering capability enhances agility, responsiveness, and enables functionalities such as beamforming, beam scanning, and nulling interference.

Antenna Weight Vector (AWV) Tables play a crucial role in the operation and optimization of phased-array antennas. In the context of phased-array systems, the term "weight vector" refers to a set of complex weights assigned to each antenna element. These weights determine the amplitude and phase of the signals fed to individual elements, influencing the direction and characteristics of the emitted or received beam. Antenna Weight Vector Tables serve as a comprehensive reference that specifies the optimal weightings for each antenna element in various scenarios. These tables are generated through rigorous calibration processes, simulations, or measurements, considering factors such as desired beam direction, signal-to-noise ratio, and interference mitigation. However, in practice, each antenna has a corresponding AWV table. An array of n-antenna elements has n AWV tables. The size of the AWV table affects the size of the integrated circuit (IC). In some applications for larger arrays, the beam width is very small. Thus, many beams are needed to cover the field of view. This leads to a very large AWV table.

Enhancement and improvement are needed to reduce the size of the AWV tables for the phased-array antennas.

SUMMARY

Method and system are provided for reducing the AWV table size for phased-array antenna. In one novel aspect, the AWV table is decomposed to a combination of a first AWV table and a second AWV table, and wherein a size of a sum of a size of the azimuth AWV table and a size of the elevation AWV table is smaller than the size of the AWV table. In one novel aspect, a group of decomposable AWVs are identified and each decomposed into a decomposed first AWVs and a decomposed second AWVs, and the first AWV table includes the decomposed first AWVs and non-decomposed AWVs, and the azimuth AWV table includes the decomposed second AWVs and non-decomposed AWVs. In one embodiment, the group of decomposable AWVs and a group of non-decomposable AWVs are formed based on a determined elevation. The group of decomposable AWVs have an elevation that is near 0°. In one embodiment, the decomposable AWVs have weights W that are decomposed into $W_h$ and $W_v$, and wherein $W_v$ is a function of elevation θ only and $W_h$ is a function of both elevation θ and azimuth φ. In one embodiment, the azimuth AWV table further includes an active az beam index and the elevation AWV table further includes an active el beam index. In one embodiment, the active az beam index is indicated by an az pointer and the active el beam index is indicated by an el pointer for the beamforming control. In one embodiment, the system combines the first AWV table and the second AWV table for the beamforming control. In one embodiment, wherein phase shift values in the first AWV table and the second AWV table are combined with modulo 360-degree. In one embodiment, delay values are added for the first AWV table and the second AWV table when performing broadband phased-array operations. In one embodiment, a composite gain value is a sum of gain adjustment values in the first AWV table and the second AWV table.

In one novel aspect, the AWV table for a phased-array antenna with N antenna elements with $M_v$ weights in a vertical direction and $M_h$ weights in a horizontal direction is decomposed into a first AWV table and a second AWV table with a combined size of $N^*(M_v+M_h)$. In one embodiment, the phased-array array antenna is a planar-structured phased-array antenna with $N=N_v{}^*N_h$, and wherein the combined size of the decomposed first AWV table and second AWV table has a size of $N_v{}^*N_h{}^*(M_v+M_h)$. In one embodiment, the second AWV table is computed using $$W_h^{90}(\varphi_0') = e^{-j2\pi(nd_h-0_h)sin(\pi/2)sin(\varphi_0')/\lambda} * e^{-j2\pi(md_v-0_v)cos(\pi/2)sin(\varphi_0')/\lambda},$$

and the first AWV table is computed using $$W_v^0(\theta_0) = e^{-j2\pi(nd_h-0_h)sin(\theta_0)sin(0)/\lambda} * e^{-j2\pi(md_v-0_v)cos(\theta_0)/\lambda}$$

In one embodiment, $\varphi_0'$ is computed using $$\varphi_0' = \sin^{-1}(\sin(\theta_0)\sin(\varphi_0)).$$

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
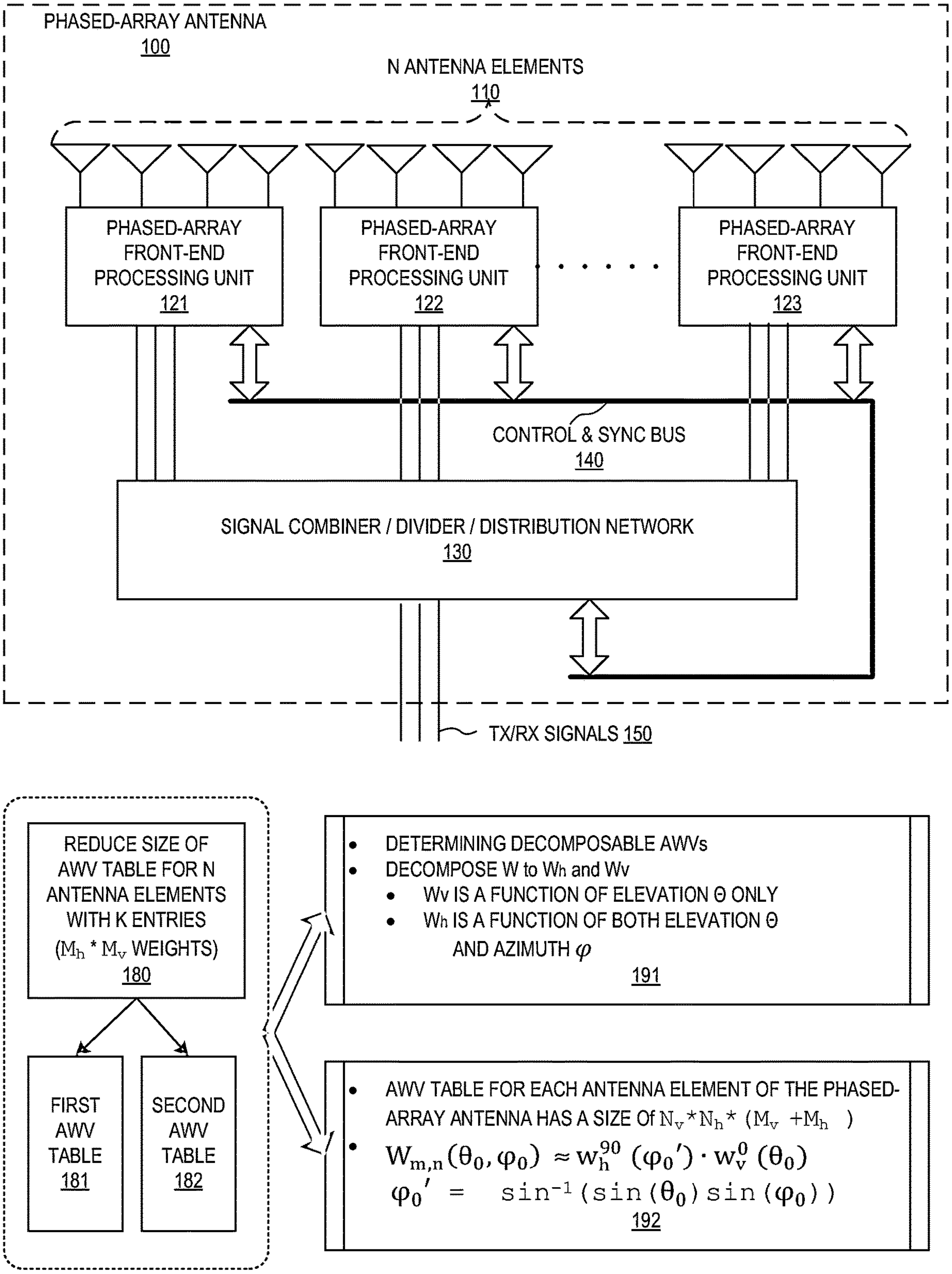
FIG. 1 illustrates an exemplary phased-array antenna system with reduced sized AWV tables in accordance with embodiments of the current invention.

FIG. 1 illustrates an exemplary phased-array antenna system with reduced sized AWV tables in accordance with embodiments of the current invention. Phased-array antenna 100 has multiple numbers of N antenna elements 110 served by multiple phased-array frontend process units, such as frontend process units 121, 122, and 123. Phased-Array Frontend Processing typically consists of power amplifier (PA) and Phase-Shifter for Transmit Array and low noise amplifier (LNA) and Phase Shifter for Receive Array. For TDD (Time-Division Duplexing) array, it consists of antenna switch, PA, TX phase Shifter, LNA and RX Phase shifter. Phased-Array Frontend Processing Unit can be an RFIC. phased-array antenna system 100 also includes signal combiner/divider/distribution network 130 and control and synchronization bus 140. Phased-array antenna system 100 performs signal transmission and reception (150) through signal combiner/divider/distribution network 130. AWV tables are stored for each antenna elements in antenna system 100. In one exemplary scenario 180 an AMV table for a phased-array antenna with N antenna elements has a size of K*N, wherein K is the number of entries. For example, for a table to for $M_h$ horizontal weights and $M_v$ vertical weights, the number of entries $K=M_v*M_h$. In one novel aspect, the size of the AWV tables are reduced to less than $N*M_v*M_h$. In one novel aspect, system 100 has plurality of $N_h*N_v$ antenna elements (110), each includes a frontend processing unit (121, 122, 123), a digital controller, a phased array, a phase shifter, and a low noise amplifier, a signal combiner (130), and a control and synchronization bus 140, wherein the digital control of each antenna element has a corresponding AWV table for $M_v$ weights in a vertical direction and $M_h$ weights in a horizontal direction, and wherein the AWV table is decomposed to a combination of a first AWV table and a second AWV, and wherein a size of a sum of a size of the first AWV table and a size of the second AWV is smaller than $N_h*N_v*M_h*M_v$.

In one embodiment 191, system 100 determines a group of decomposable AWVs, and decomposes the decomposable AWVs have weights W that are decomposed into $W_h$ and $W_v$, and wherein $W_v$ is a function of elevation θ only and $W_h$ is a function of both elevation θ and azimuth φ. In another embodiment 192, system 100 generates the AWV table for each antenna element of the phased-array antenna with a size of $N_v*N_h*(M_v+M_h)$, using the $$W_{m,n}(\theta_0, \varphi_0') \approx W_v^0(\theta_0) W_h^{90}(\varphi_0')$$

wherein $\varphi_0'=\sin^{-1}(\sin(\theta_0)\sin(\varphi_0))$.

Figure 2:
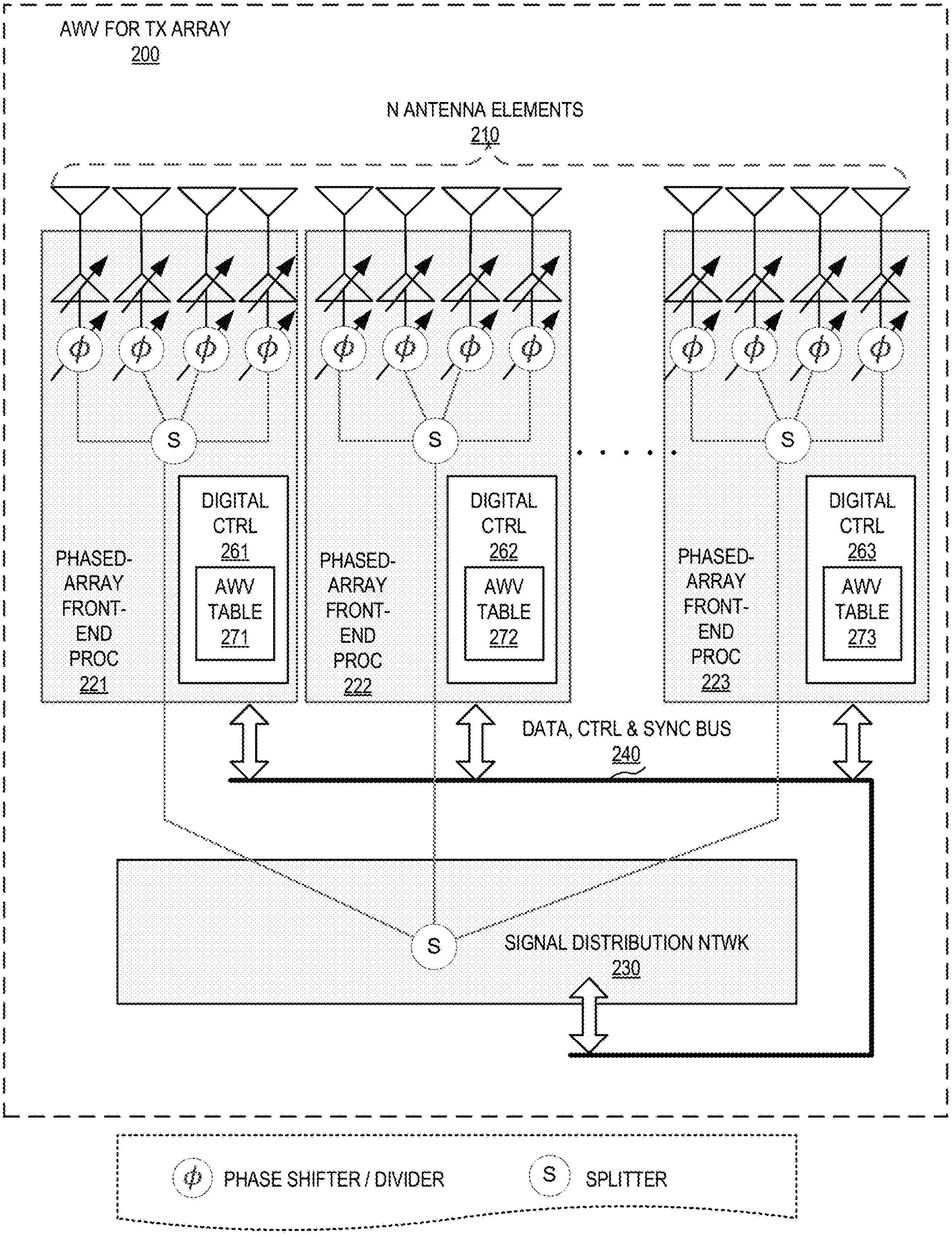
FIG. 2 illustrates exemplary diagrams for AWV for transmit array in accordance with embodiments of the current invention.

FIG. 2 illustrates exemplary diagrams for AWV for transmit array in accordance with embodiments of the current invention. TX array 200 has N antenna elements 210 configured with multiple phased-array frontend processors, such as frontend processors 221, 222, and 223. The phased-array frontend processors communicate with signal distribution network 230. Each digital controller, such as digital controller 261, 262, and 263, has an AWV table, such as AWV tables 271, 272, and 273. The settings of the variable amplifier and phase shifter of the entire array corresponding to an antenna beam are called AWV (Antenna Weight Vector). The digital control together with a data, control, and synchronization bus 240 can be used to provide the AWV for controlling the phased-array beam steering or beam shaping. In order to steer the beam or switch the beam quickly and have synchronous control of the AWV for the entire array, multiple AWV settings can be stored in an AWV table inside the Digital Control, such as digital control 261, 262, and 263. The central control of the array can provide a pointer to a specific AWV stored within the AWV table to switch the beam. This facilitates beam switching since it avoids having to update the AWV of the entire array. In one embodiment, the pointer can be passed to each AWV table ahead of time. A beam switch pulse can be used to activate the pointer. This achieves the simultaneous switch of beam of the antenna array in precisely controlled timing (from the beam switch pulse).

Figure 3:
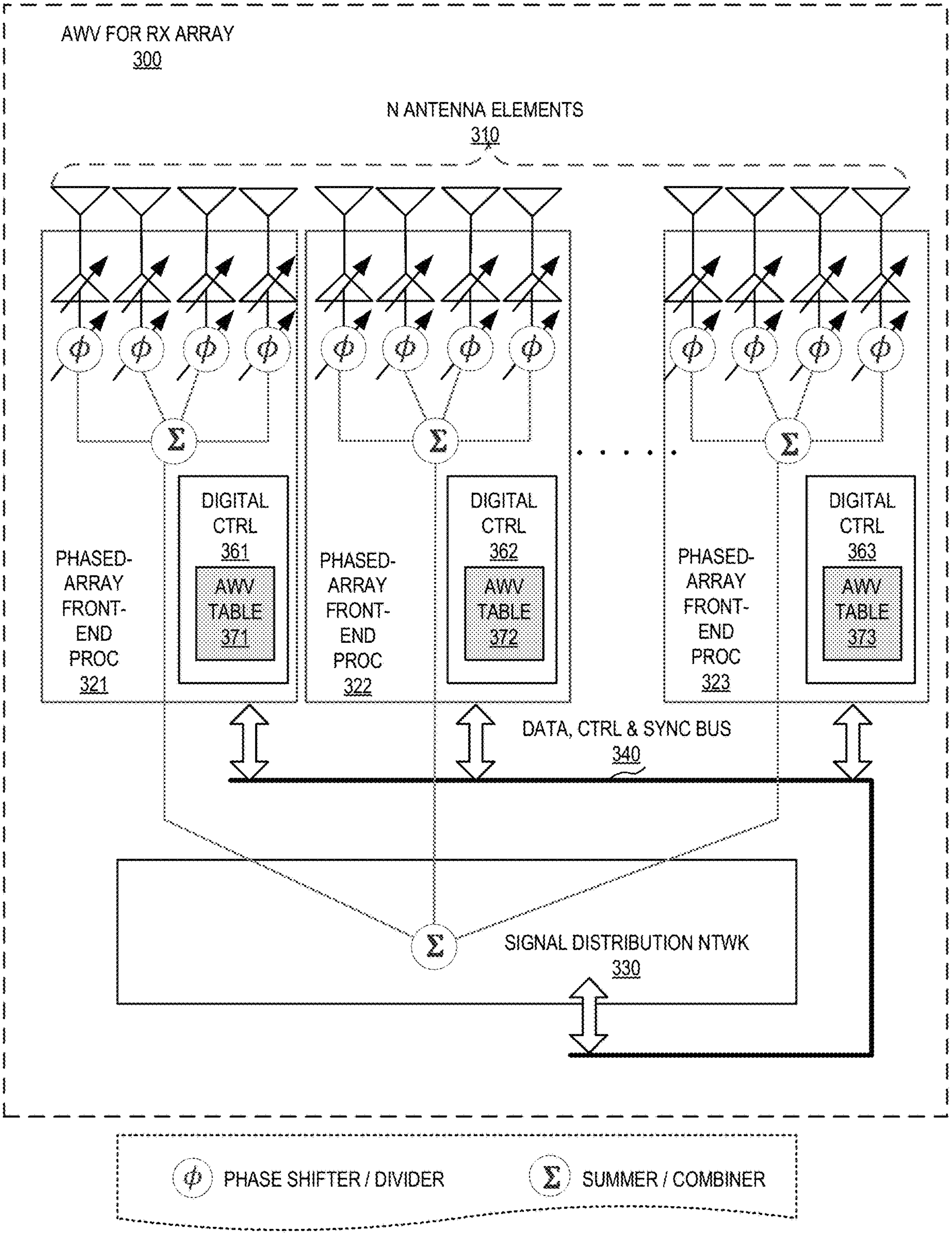
FIG. 3 illustrates exemplary diagrams for AWV for receive array in accordance with embodiments of the current invention.

FIG. 3 illustrates exemplary diagrams for AWV for receive array in accordance with embodiments of the current invention. RX array 300 has N antenna elements 310 configured with multiple phased-array frontend processors, such as frontend processors 321, 322, and 323. The phased-array frontend processors communicate with signal distribution network 430. Each digital controller, such as digital controller 361, 262, and 263, has an AWV table, such as AWV tables 371, 372, and 373. The settings of the variable amplifier and phase shifter of the entire array corresponding to an antenna beam are called AWV (Antenna Weight Vector). The digital control together with a data, control, and synchronization bus 340 can be used to provide the AWV for controlling the phased-array beam steering or beam shaping. In order to steer the beam or switch the beam quickly and have synchronous control of the AWV for the entire array, multiple AWV settings can be stored in an AWV table inside the Digital Control, such as digital control 361, 362, and 363. In one embodiment, for broadband phased array, the phase shifter should be replaced with the variable delay.

Figure 4:
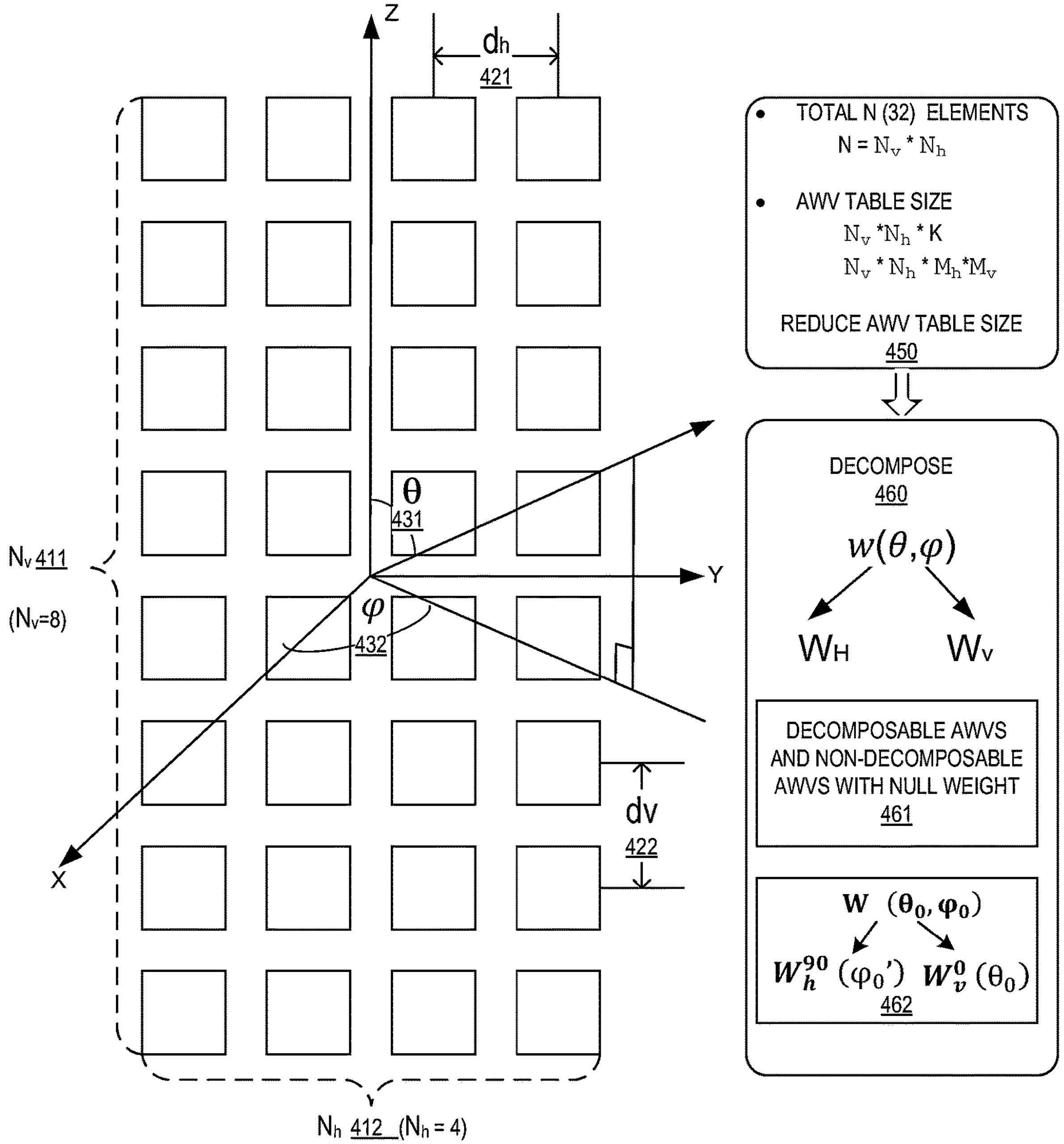
FIG. 4 illustrates exemplary diagrams for uniform planar array with reduced sized AWV tables in accordance with embodiments of the current invention.

FIG. 4 illustrates exemplary diagrams for uniform planar array with reduced sized AWV tables in accordance with embodiments of the current invention. An illustrated planar-structured phased-array antenna has $N_v$ 411 ($N_v$=8) rows and $N_h$ 412 ($N_h$=4) columns, with a total of N (N=$N_v$*$N_h$=32) antenna elements. Each AWV includes at least phase shifter settings and amplitude (gain) setting$)_{m,n}$, m=0, 1, . . . $N_v$ and n=0, 1, . . . , $N_h$ for each antenna element$_{m,n}$ in an $N_h$×$N_v$ elements uniform planar array. Since each antenna has a corresponding AWV Table. An array of n-antenna elements has n AWV Tables. The size of the AWV Table affects the size of the IC. In one novel aspect 450, the AWV table size is reduced. In some applications or larger array, the beam width is very small. Thus, many beams are needed to cover the field of view. This leads to very large AWV table. Size of AWV table with K entries is K* size of (phase shifter settings, amplitude (gain) setting$)_{m,n}$×$N_h$×$N_v$.

As illustrated, assuming the planar-structured phased-array antenna is structured between each antenna element with a $d_h$ 421 horizontally and a $d_v$ 422 vertical. For a beam direction (θ, φ), with θ 431 is being azimuth and φ 432 being the elevation, $$d_{1+m+nNv} = [0\ ,\ nd_h,\ md_V]$$

$$\text{where } m = 0, 1, \dots , N_v - 1$$

$$n = 0, 1, \dots , N_h - 1$$

Alternatively, the position vector for antenna element (m,n) is $$d_{m,n} = [0\ ,\ nd_h - O_h,\ md_V - O_V],$$

$$\text{where } m = 0, 1, \dots , N_v - 1,\ O_v = -(N_v + 1)/2 * d_v$$

$$n = 0, 1, \dots , N_h - 1,\ O_h = -(N_h + 1)/2 * d_h$$

The antenna amplitude pattern in the direction of (θ, φ) can be written (approximated) as $$g_{AA}(\theta, \varphi) = a^T(\theta, \varphi)w$$

where the array response vector is $$[a(\theta, \varphi)]_{1+m+nNv} = g(\theta, \varphi)\left[e^{jd*k(\theta,\varphi)}_{m,n}\right]$$

$$\text{and } w = [w_{m,n}] \text{ and } k = \frac{2\pi}{\lambda}\hat{r} = \frac{2\pi}{\lambda}(\sin(\theta)\cos(\varphi), \sin(\theta)\sin(\varphi), \cos(\theta))$$

wherein g(θ, φ) is the element pattern. For steering to direction (θ, φ), the weight vector should be set to conjugate of the response vector:

$$g_{AA}(\theta, \varphi) = a^T(\theta, \varphi)w = g(\theta, \varphi)AF(\theta, \varphi)$$

where the array factor $$AF(\theta, \varphi) = \sum\nolimits_{m=1}^{N_v} \sum\nolimits_{n=1}^{N_H} W_{m,n} e^{jd^T_{m,n}\cdot k(\theta,\varphi)}.$$

In one novel aspect, the weight W((θ,φ) is decomposed to $W_h$ and $W_v$. In one embodiment 461, a group of decomposable AWVs are determined. w should be a conjugate of a(θ,φ). It is an inner product of two vectors.

$$\begin{aligned} w(\theta, \varphi) &= e^{-j\left(d_{m,n} * k(\theta,\varphi)\right)} \\ &= e^{-j2\pi\left[0\cdot sin(\theta)cos(\varphi)+nd_h sin(\theta)sin(\varphi)+md_V cos(\theta)\right]/\lambda} \\ &= e^{-j2\pi nd_h sin(\theta)sin(\varphi)/\lambda} \cdot e^{-j2\pi md_V cos(\theta)/\lambda} \\ &= w_H(\theta, \varphi) \cdot w_V(\theta, \varphi) \end{aligned}$$

Therefore, weights w can be decomposed into $W_H$ (or $W_h$) and $W_v$, where $W_v$, is function of elevation θ only. $W_H$ is a function of both elevation θ and azimuth φ so that this decomposition is a good approximation only when θ is close to 90° (elevation near 0°). Distorted beams are seen at high elevation.

In one embodiment, a group of AWV is determined to be decomposable AWVs. A decomposable elevation is determined, a decomposable θ is determined based on the decomposable elevation, and the decomposable group of AWVs is formed based on the decomposable θ. In one embodiment, the decomposable group of AWVs is a product of the decomposed first/elevation AWVs and the decomposed second/azimuth AWVs. We can decompose the weight into Kronecker product of the v and h components $$w = w_v \otimes w_h$$

where the $$w_v = \frac{1}{\sqrt{N_v}}\left[e^{-jd_v\cdot 0\cdot kcos(\theta_0)},\ e^{-jd_v\cdot 1\cdot kcos(\theta_0)},\ \dots,\ e^{-jd_v\cdot(N_v-1)\cdot kcos(\theta_0)}\right]$$

$$w_h = \frac{1}{\sqrt{N_h}}\left[e^{-jd_h\cdot 0\cdot ksin(\theta_0)sin(\varphi_0)},\ e^{-jd_h\cdot 1\cdot ksin(\theta_0)sin(\varphi_0)},\ \dots,\ e^{-jd_h\cdot(N_h-1)\cdot ksin(\theta_0)sin(\varphi_0)}\right]$$

Further, we can also decompose the $$AF(\theta, \varphi) = AF_v(\theta, \varphi) * AF_h(\theta, \varphi)$$

where $$AF_v(\theta, \varphi) = \sum\nolimits_{m=1}^{N_v} e^{jd_v\cdot m\cdot k\left(cos\theta - cos(\theta_0)\right)}$$

and $$AF_h(\theta, \varphi) = \sum\nolimits_{n=1}^{N_h} e^{jd_h\cdot n\cdot k\left(sin(\theta)sin(\varphi) - sin(\theta_0)sin(\varphi_0)\right)}$$

in which each is the product of the response vector in v or h direction and the corresponding weight vector in v or h, respectively. In one embodiment, the decomposing applies to both an amplitude adjustment and a phase adjustment. In particular, if the shape of the antenna pattern is to be adjusted, both amplitude and phase shift are required. The above decomposition is applicable to both amplitude and phase adjustment.

In one embodiment 462, the weight vector is simplified based on $$W_{m,n}(\theta_0, \varphi_0) \approx w_h^{90}(\varphi_0') \cdot w_v^0(\theta_0, \varphi)$$
$$= e^{-j2\pi(nd_h - O_h)sin(\varphi_0')/\lambda} \cdot e^{-j2\pi(md_v - O_v)cos(\theta_0)/\lambda}$$

where $$\varphi_0' = \sin^{-1}(\sin(\theta_0)\sin(\varphi_0))$$

Figure 5:
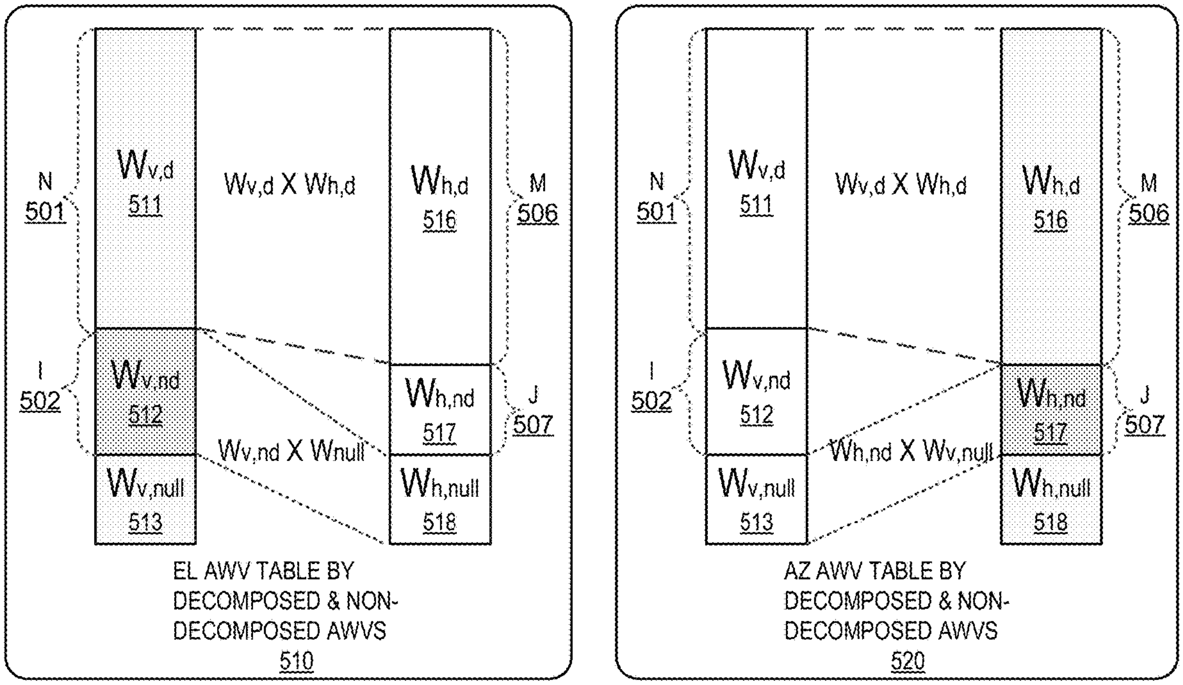
FIG. 5 illustrates exemplary diagrams of reduced sized AWV tables with decomposable AWVs and non-decomposable AWVs in accordance with embodiments of the current invention.

FIG. 5 illustrates exemplary diagrams of reduced sized AWV tables with decomposable AWVs and non-decomposable AWVs in accordance with embodiments of the current invention. In one novel aspect, the system generates and stores an elevation AWV table and an azimuth AWV table as the AWV table for each antenna element of the phased-array antenna. In one embodiment, the elevation AWV table includes the decomposed elevation AWVs 511 and non-decomposable AWVs 512, and the azimuth AWV table includes the decomposed azimuth AWVs 516 and non-decomposable AWVs 517. In one embodiment, the decomposable AWVs have weights W that are decomposed into $W_h$ and $W_v$, and wherein $W_v$ is a function of elevation θ only and $W_h$ is a function of both elevation θ and azimuth φ. In one embodiment, elevation AWV table further includes corresponding null weight $W_{v,null}$ 513 and the azimuth AWV table further include corresponding null weight $W_{h,null}$ 518. Null weight $W_{v,null}$ 513 and $W_{h,null}$ 518 have zero phase shift and an amplitude equals to one. For the antenna beams and the corresponding AWVs which can be decomposable (i.e. $w_d = w_v \otimes w_h$) we can group them as decomposable group. For the antenna beams, that cannot be decomposable (i.e., $w \neq w_v \otimes w_h$), we can create a null weight called $W_{null}$ (513 and 518) (i.e., zero phase shift, amplitude=1) stores in an entry of the $w_h$ AWV table and store the w_nd in an entry of the $w_v$ AWV table. Thus, the resulting AWV is $w = W_{nd} \otimes W_{null} = W_{nd}$.

As illustrated, EL AWV table 510 has N 501 decomposed entries of $W_{v,d}$, and I 502 entries of non-decomposable $W_{v,nd}$ and a null weight entry $W_{v,null}$ 513. AZ AWV table 520 has M 506 decomposed entries of $W_{h,d}$, and J 507 entries of non-decomposable $W_{h,nd}$ and a null weight entry $W_{h,null}$ 518. The size of the EL AWV table is N+I+1, and the size of the EL AWV table is M+J+1. The total number of AWVs stored within the EL AWV table and AZ AWV table is N×M+I+J. If N and M are sufficiently large, the number of AWVs stored within the EL AWV table and AZ AWV table is large. The actual size of AWV table is M+N+I+J+2, which is a reduced size of the AWV table.

Figure 6:
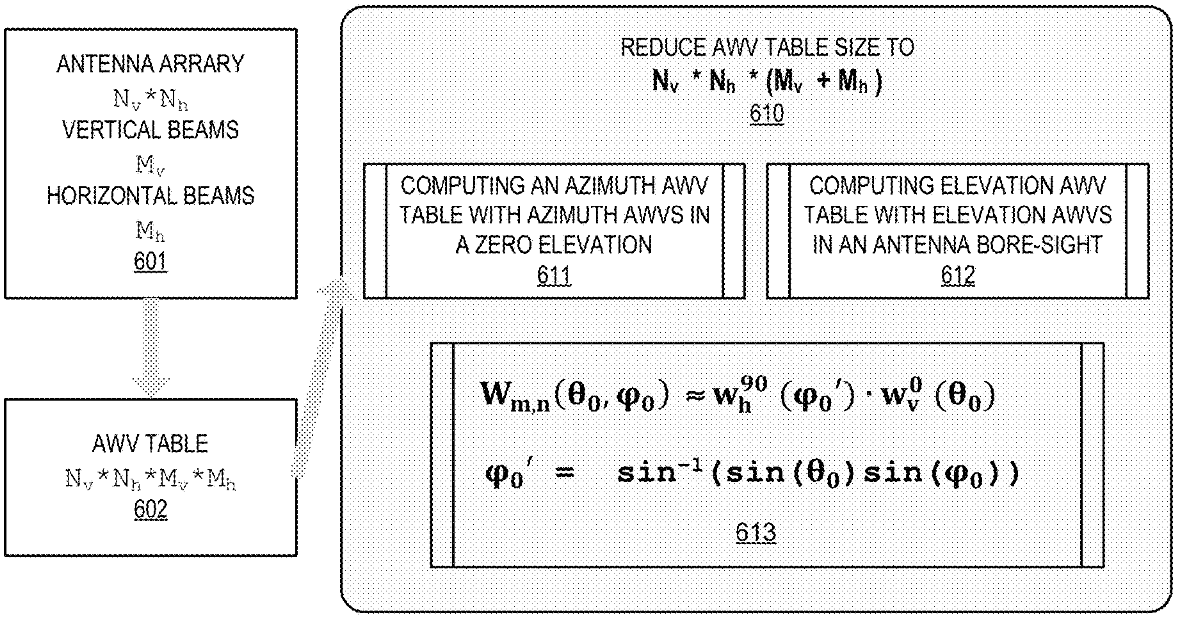
FIG. 6 illustrates exemplary diagrams reduced sized AWV tables with equivalent azimuth to decompose the AWV tables in accordance with embodiments of the current invention.

FIG. 6 illustrates exemplary diagrams reduced sized AWV tables with equivalent azimuth to decompose the AWV tables in accordance with embodiments of the current invention. In one novel aspect, the system computes an azimuth AWV table with azimuth AWVs for $M_h$ weights in a zero elevation and an elevation AWV table with elevation AWVs for $M_v$ weights in an antenna bore-sight, and obtains an equivalent azimuth $\varphi_0'$, wherein the equivalent azimuth $\varphi_0'$ is based on a beam direction of an azimuth $\varphi_0$ and an elevation $\theta_0$, and wherein the product of the azimuth AWV ($\varphi_0'$) and the elevation AWV ($\theta_0$) is an approximate of the AWV($\theta_0$, $\varphi_0$).

In one setting 601, antenna array with $N_v$*$N_h$ antenna elements, with $M_v$ vertical weights and $M_h$ horizontal weights, the AWV table needs a size of $N_v$*$N_h$*$M_v$*$M_h$ (602). In one novel aspect 610, the weight vector is reduced to $N_v$*$N_h$*($M_v$+$M_h$). For a beam pointing toward direction ($\theta_0$,$\varphi_0$), the directional cosine is $$a(\theta_0, \varphi_0) = \frac{2\pi}{\lambda}[\sin\theta_0\cos\varphi_0, \sin\theta_0\sin\varphi_0, \cos\theta_0]$$

and the weight for element (m,n) is $$w_{m,n}(\theta_0, \varphi_0) = e^{-jd_{m,n}^T a(\theta_0,\varphi_0)}$$
$$= e^{-j2\pi[0 \cdot sin(\theta_0)cos(\varphi_o) + (nd_h - O_h)sin(\theta_0)sin(\varphi_0) + md_v - O_v)cos(\theta_0)]/\lambda}$$
$$= e^{-j2\pi(nd_h - O_h)sin(\theta_0)sin(\varphi_0)/\lambda} \cdot e^{-j2\pi(md_v - O_v)cos(\theta_0)/\lambda}$$
$$= w_h(\theta_0, \varphi_0) \cdot w_v(\theta_0)$$

here $w_h$ is a function of both $\theta_0$ and φ0 while $w_v$ is a function of only $\theta_0$.

A reduced-table-size beamforming method uses simplified weight:

$$w_{m,n}(\theta_0, \varphi_0) \approx w_h^{90}(\varphi_0') \cdot w_v^0(\theta_0)$$
$$= e^{-j2\pi(nd_h - O_h)sin(\varphi_0')/\lambda} \cdot e^{-j2\pi(md_v - O_v)cos(\theta_0)/\lambda}$$

where $$\varphi_0' = \sin^{-1}(\sin(\theta_0)\sin(\varphi_0))$$

$$w_h^{90}(\varphi_0')$$

is the weight toward direction (90°,$\varphi_0'$), 1-D beams lined horizontally with zero elevation and $$w_v^0(\theta_0)$$

is the weight toward direction ($\theta_0$,0°), 1-D beams lined vertically in the antenna bore-sight. The required beam table size for each antenna element is thus reduced from $M_v \times M_h$ down to $M_v + M_h$. By using the reduced beam table, the required table size is reduced from $N_v \times N_h \times M_v \times M_h$ down to $N_v \times N_h \times (M_v + M_h)$.

At step 611, an azimuth AWV table with azimuth AWVs for $M_h$ weights in a zero elevation are generated. At step 612, an elevation AWV table with elevation AWVs for $M_v$ weights in an antenna bore-sight are generated. For each antenna element (m,n), we will compute and store $M_h$ beam table horizontally in the zero elevation by $$w_h^{90}(\varphi_0') = e^{-j2\pi(nd_h - O_h)sin(90^\circ)sin(\varphi_0')/\lambda} \cdot e^{-j2\pi(md_v - O_v)cos(90^\circ)/\lambda}$$

We will also compute and store $M_v$ beam table vertically in the antenna bore-sight by $$w_v^0(\theta_0) = e^{-j2\pi(nd_h - O_h)sin(\theta_0)sin(0^\circ)/\lambda} \cdot e^{-j2\pi(md_v - O_v)cos(\theta_0)/\lambda}$$

In one embodiment (613), in order to beam form toward direction $(\theta_0,\varphi_0)$, we have to compute:

$$\varphi_0{}' = \sin^{-1}(\sin(\theta_0)\sin(\varphi_0))$$

Then we will use approximation $$w_{m,n}(\theta_0, \varphi_0) \approx w_h^{90}(\varphi_0{}') \cdot w_v^0(\theta_0)$$

Figure 7:
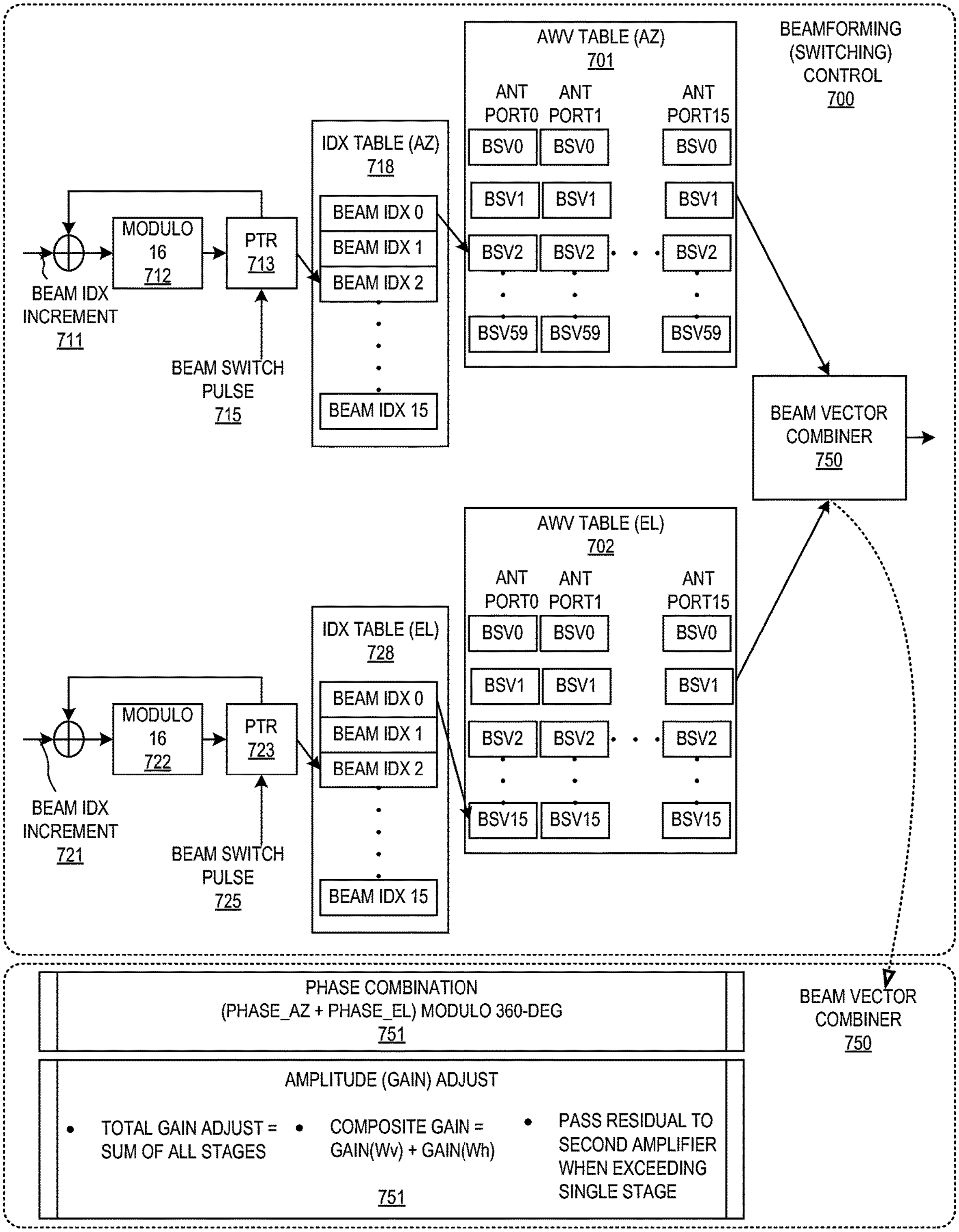
FIG. 7 illustrates exemplary diagrams for beamforming/switching control with reduced sized AWV tables in accordance with embodiments of the current invention.

FIG. 7 illustrates exemplary diagrams for beamforming/switching control with reduced sized AWV tables in accordance with embodiments of the current invention. Beamforming (switching) control 700 includes azimuth AWV table 701 and elevation AWV table 702. Beam index increment 711 is passed to Modulo 712 and beam index increment 721 is passed to Modulo 722. Beam switch pulse 715 is received by az pointer 713 and beam switch pulse 725 is received by el pointer 723. The active azimuth AWV and elevation AWV are in the two AWV tables azimuth AWV table 701 and elevation AWV table 702, which are indicated by the active az beam index 718 and active el beam index 728, respectively in the az AWV Table and el AWV table. az pointer 713 indicates the active az beam index and el pointer 723 indicates the active el beam index, respectively, in the az Beam Index table 718 and el beam index table 728.

Beam vector combiner 750 combines the azimuth AWV and elevation AWV. In one embodiment, the composite antenna weight obtained by multiplication of $$W_v = \frac{1}{\sqrt{N_v}}\left[e^{-jd_v \cdot 0 \cdot kcos(\theta_0)},\ e^{-jd_v \cdot 1 \cdot kcos(\theta_0)},\ \ldots,\ e^{-jd_v \cdot (N_v-1) \cdot kcos(\theta_0)}\right]$$

$$W_h = \frac{1}{\sqrt{N_h}}\left[e^{-jd_h \cdot 0 \cdot ksin(\theta_0)sin(\varphi_0)},\ e^{-jd_h \cdot 1 \cdot ksin(\theta_0)sin(\varphi_0)},\ \ldots,\ e^{-jd_h \cdot (N_h-1) \cdot ksin(\theta_0)sin(\varphi_0)}\right]$$

In one embodiment 751, phase combination is performed. The phase shifter value in $W_v$ and $W_h$ are added with modulo 360-degree. In one embodiment, for the broadband phased-array operation, the delay value of $W_v$ and $W_h$ are added. In one embodiment 752, amplitude (gain) adjust is performed. The amplitude (gain) adjustment can be accomplished by multiple stages of amplifiers since each stage of amplifier provides a limited range of gain adjustment. The total gain adjustment range is the sum of the gain adjustment range of all the amplifier stages. When the composite gain value is the sum of the gain adjustment values in $W_v$ and $W_h$. When the gain adjustment exceeds that of a single stage of amplifier, the residual value is passed to the second amplifier for more gain adjustment so on and so forth until the desired sum of the gain adjustment values is achieved.

Figure 8:
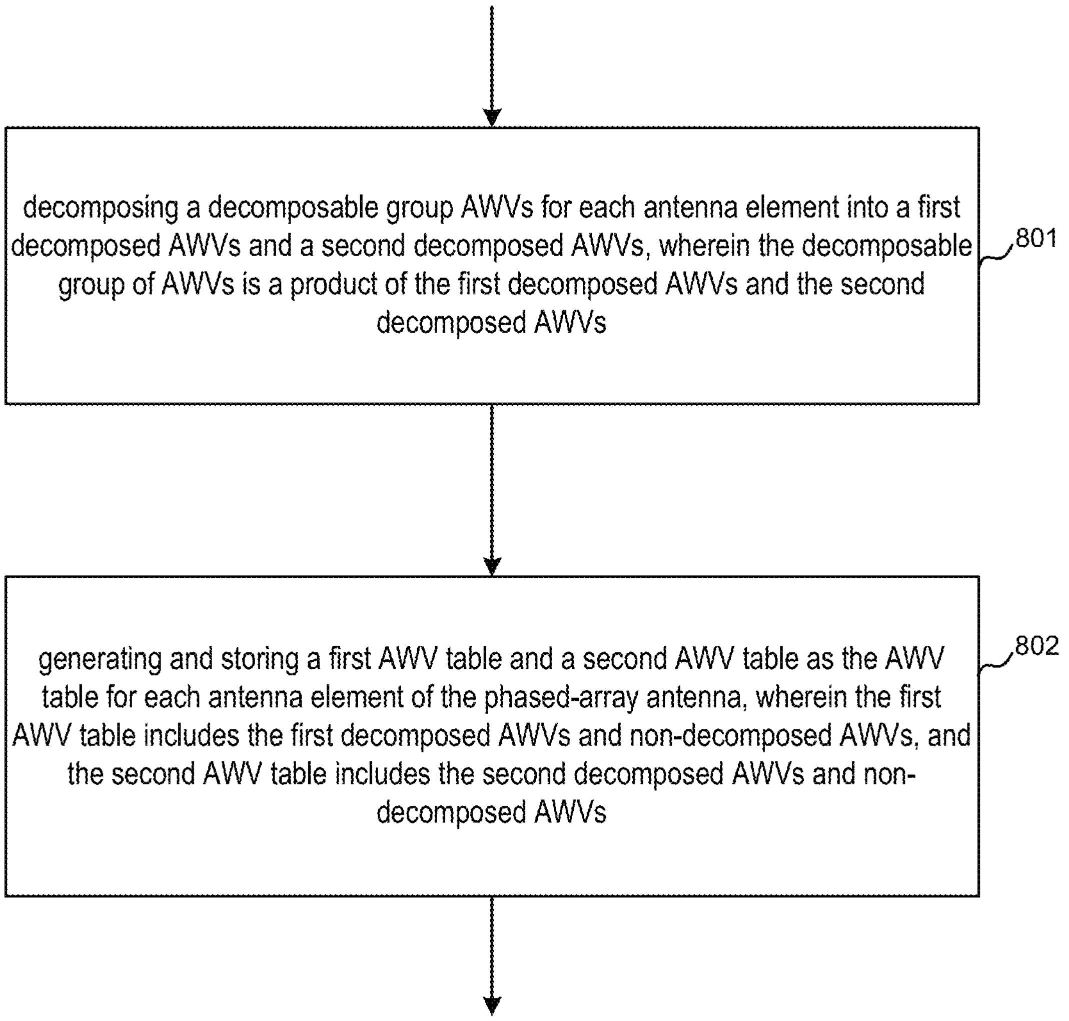
FIG. 8 illustrates an exemplary flow chart for reducing AWV table size with decomposable AWVs and non-decomposable AWVs in accordance with embodiments of the current invention.

FIG. 8 illustrates an exemplary flow chart for reducing AWV table size with decomposable AWVs and non-decomposable AWVs in accordance with embodiments of the current invention. At step 801, the system decomposes a decomposable group AWVs for each antenna element into a decomposed first AWVs and a decomposed second AWVs, wherein the decomposable group of AWVs is a product of the decomposed first AWVs and the decomposed second AWVs. At step 802, the system generates and stores a first AWV table and a second AWV table as the AWV table for each antenna element of the phased-array antenna, wherein the first AWV table includes the decomposed first AWVs and non-decomposable AWVs, and the second AWV table includes the decomposed second AWVs and non-decomposable AWVs.

Figure 9:
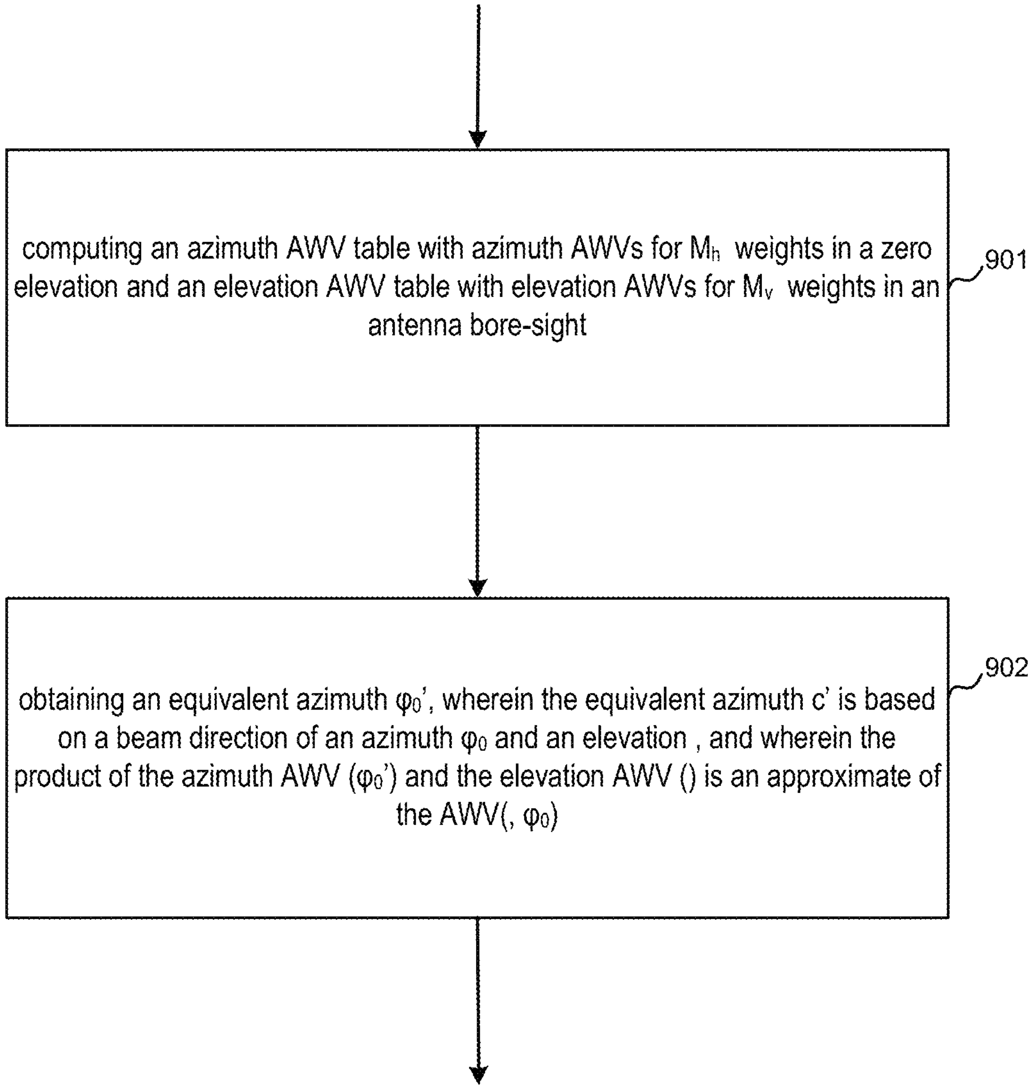
FIG. 9 illustrates an exemplary flow chart for reducing AWV table size with equivalent azimuth to decompose the AWV tables in accordance with embodiments of the current invention.

FIG. 9 illustrates an exemplary flow chart for reducing AWV table size with equivalent azimuth to decompose the AWV tables in accordance with embodiments of the current invention. At step 901, the system computes an azimuth AWV table with azimuth AWVs for $M_h$ weights in a zero elevation and an elevation AWV table with elevation AWVs for $M_v$ weights in an antenna bore-sight. At step 902, the system obtains an equivalent azimuth $\varphi_0'$, wherein the equivalent azimuth $\varphi_0'$ is based on a beam direction of an azimuth $\varphi_0$ and an elevation $\theta_0$, and wherein the product of the azimuth AWV $(\varphi_0')$ and the elevation AWV $(\theta_0)$ is an approximate of the AWV$(\theta_0, \varphi_0)$.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, for reducing a size of an antenna weight vector (AWV) table of each corresponding antenna element of a phased-array antenna, comprising:

decomposing a decomposable group AWVs for each antenna element into a first decomposed AWVs and a second decomposed AWVs, wherein the decomposable group of AWVs is a product of the first decomposed AWVs and the second decomposed AWVs; and generating and storing a first AWV table and a second AWV table as the AWV table for each antenna element of the phased-array antenna, wherein the first AWV table includes the first decomposed AWVs and non-decomposed AWVs, and the second AWV table includes the second decomposed AWVs and non-decomposed AWVs.

2. The method of claim 1, wherein the decomposable AWVs have weights W that are decomposed into $W_h$ and $W_v$, and wherein $W_v$ is a function of elevation $\theta$ only and $W_h$ is a function of both elevation $\theta$ and azimuth $\varphi$.

3. The method of claim 2, wherein the first AWV table and the second AWV table further include corresponding null weight $W_{null}$ with zero phase shift and an amplitude equals to 1.

4. The method of claim 1, further comprising:

determining a decomposable elevation;

determining a decomposable angle $\theta$ based on the decomposable elevation;

forming the decomposable group of AWVs based on the decomposable angle $\theta$.

5. The method of claim 4, wherein the decomposable angle $\theta$ is close to 90°.

6. The method of claim 1, wherein each AWV comprises at least phase shifter settings and amplitude gain settings.

7. The method of claim 6, wherein the decomposing applies to both an amplitude adjustment and a phase adjustment.

8. The method of claim 1, wherein the first AWV table further includes an active elevation beam index and the second AWV table further includes an active azimuth beam index.

9. The method of claim 8, wherein the active elevation beam index is indicated by an elevation pointer and the active azimuth beam index is indicated by an azimuth pointer for the beamforming control.

10. The method of claim 1, further comprising:

performing a beamforming control based on the first AWV table and the second AWV table the phased-array antenna, and wherein the beamforming control is performed by combining the first AWV table and the second AWV table for the beamforming control.

11. The method of claim 10, wherein phase shift values in the first AWV table and the second AWV table are combined with modulo 360-degree.

12. The method of claim 11, wherein delay values are added for the first AWV table and the second AWV table when performing broadband phased-array operations.

13. The method of claim 10, wherein a composite gain value is a sum of gain adjustment values in the first AWV table and the second AWV table.

14. The method of claim 13, wherein a gain adjustment exceeds a single stage amplifier range, a residual value is passed to a second amplifier for more gain adjustment.

15. A system with reduced size of antenna weight vector (AWV) tables, comprising:

a plurality of $N_h$*$N_v$ antenna elements for a phased-array antenna with a size of Nv by Nh in a uniform planar structure, each includes a frontend processing unit, a digital controller;

a signal combiner; and a control and synchronization bus, wherein the digital control of each antenna element has a corresponding AWV table for $M_v$ weights in a vertical direction and $M_h$ weights in a horizontal direction, and wherein the AWV table is decomposed to a combination of a first AWV table and a second AWV table, and wherein a size of a sum of a size of the first AWV table and a size of the second AWV table is smaller than $N_h*N_v*M_h*M_v$.

16. The system of claim 15, a group of decomposable AWVs are identified and each decomposed into a decomposed first AWVs and a decomposed second AWVs, and the first AWV table includes the of decomposed first AWVs and non-decomposed AWVs, and the second AWV table includes the decomposed second AWVs and non-decomposed AWVs.

17. The system of claim 16, wherein the decomposable AWVs have weights W that are decomposed into $W_h$ and $W_v$, and wherein $W_v$ is a function of elevation θ only and $W_h$ is a function of both elevation θ and azimuth φ.

18. The system of claim 15, wherein the AWV table for each antenna element of the phased-array antenna has a size of $N_v*N_h*(M_v+M_h)$.

19. The system of claim 18, wherein an element (m, n) of the second AWV table is computed using $$W_h^{90}(\varphi_0{}') = e^{-j2\pi\left(nd_h-0_h\right)sin(\pi/2)sin\left(\varphi_0{}'\right)/\lambda} * e^{-j2\pi(md_v-0_v)cos(\pi/2)sin\left(\varphi_0{}'\right)/\lambda},$$

and an element (m, n) of the first AWV table is computed using $$W_v^{0}(\theta_0) = e^{-j2\pi\left(nd_h-0_h\right)sin\left(\theta_0\right)sin(0)/\lambda} * e^{-j2\pi(md_v-0_v)cos\left(\theta_0\right)/\lambda},$$

wherein λ is a wavelength, $d_v$ is vertical spacing for antenna elements, $d_h$ is horizontal spacing for antenna elements, and $O_v=-(N_v+1)/2*d_v$, $O_h=-(N_h+1)/2*d_h$.

20. The system of claim 19, wherein $\varphi_0'$ is computed using $$\varphi_0{}' = \sin^{-1}(\sin(\theta_0)\sin(\varphi_0)).$$

* * * * *